(12) United States Patent
Filsfils et al.

(10) Patent No.: US 7,639,688 B2
(45) Date of Patent: Dec. 29, 2009

(54) AUTOMATIC PROTECTION OF AN SP INFRASTRUCTURE AGAINST EXTERIOR TRAFFIC

(75) Inventors: Clarence Filsfils, Brussels (BE); Stefano B. Previdi, Rome (IT); John Galen Scudder, Ann Arbor, MI (US); David D. Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 613 days.

(21) Appl. No.: 11/183,381

(22) Filed: Jul. 18, 2005

(65) Prior Publication Data

US 2007/0014293 A1 Jan. 18, 2007

(51) Int. Cl.
*H04L 12/56* (2006.01)

(52) U.S. Cl. .................... 370/392; 370/230; 370/400; 713/201

(58) Field of Classification Search .................. 370/389, 370/401, 351, 352, 392; 709/224, 227, 249; 713/201

See application file for complete search history.

(56) References Cited

U.S. PATENT DOCUMENTS

| | | | | |
|---|---|---|---|---|
| 5,917,820 | A * | 6/1999 | Rekhter ................... | 370/392 |
| 6,185,214 | B1 * | 2/2001 | Schwartz et al. .......... | 370/401 |
| 6,219,706 | B1 | 4/2001 | Fan et al. | |
| 6,487,666 | B1 | 11/2002 | Shanklin et al. | |
| 6,738,814 | B1 | 5/2004 | Cox et al. | |
| 6,792,546 | B1 | 9/2004 | Shanklin et al. | |
| 6,813,266 | B1 * | 11/2004 | Chiang et al. ............. | 370/389 |
| 6,854,063 | B1 | 2/2005 | Qu et al. | |
| 6,876,655 | B1 * | 4/2005 | Afek et al. ............... | 370/392 |
| 7,248,563 | B2 * | 7/2007 | Bhogal et al. ............. | 370/230 |
| 2002/0069366 | A1 * | 6/2002 | Schoettger ............... | 713/201 |
| 2002/0089929 | A1 * | 7/2002 | Tallegas et al. ........... | 370/230 |
| 2003/0177391 | A1 * | 9/2003 | Ofek et al. .............. | 713/201 |
| 2004/0047348 | A1 * | 3/2004 | O'Neill .................. | 370/389 |
| 2004/0181694 | A1 * | 9/2004 | Cox et al. ............... | 713/201 |
| 2004/0205215 | A1 * | 10/2004 | Kouvelas et al. .......... | 709/231 |
| 2005/0018618 | A1 * | 1/2005 | Mualem et al. ........... | 370/252 |
| 2005/0111466 | A1 * | 5/2005 | Kappes et al. ............ | 370/400 |

(Continued)

OTHER PUBLICATIONS

Moy, J., RFC 2328, entitled OSPF Version 2, Apr. 1998, pp. 1-204.

(Continued)

*Primary Examiner*—Dang T Ton
*Assistant Examiner*—Mohamed Kamara
(74) *Attorney, Agent, or Firm*—Cesari and McKenna, LLP (57) ABSTRACT

A method and system for protecting valuable resources within an autonomous system network. Address prefixes within the system are designated as valuable and a flag bit is associated with the address within routing tables of routers of the network. Interfaces to border routers are identified and when packets are received at those interfaces, the packets are flagged with a flag or tag bit. The destination address of the received packet is compared to the flag bit associated with the valuable resource prefix, and if the packet is directed to that resource the packet is dropped and/or logged, but the packet is not forwarded to that resource. In specific cases an interface from an external source may be configured to not create the flag or tag bit, wherein that packet will be delivered to the destination prefix of the packet.

17 Claims, 3 Drawing Sheets

U.S. PATENT DOCUMENTS

2005/0141498 A1    6/2005    Cam Winget et al.

OTHER PUBLICATIONS

Rekhter, Y., RFC 1771, entitled A Border Gateway Protocol (BGP-4), Mar. 1995, pp. 1-54.

Callon, R., RFC 1195, entitled Use of OSI IS-IS for Routing in TCP/IP and Dual Environments, Dec. 1990, pp. 1-80.

Perlman, Radia, "Interconnections: Bridges and Routers", Sections 10.2.3 through 10.2.3.4.3, pp. 323-329, Addison Wesley Longman, Inc., 1992.

* cited by examiner

AUTOMATIC PROTECTION OF AN SP INFRASTRUCTURE AGAINST EXTERIOR TRAFFIC

BACKGROUND OF THE INVENTION

1. Field of the Invention

The present invention relates to computer networks, and more specifically to such networks having valuable resources, e.g., content, storage and media or media servers, or other gateways, in short, any valuable asset needing protection.

2. Background Information

Data communication in a computer network involves the exchange of data between two or more entities interconnected by communication links and subnetworks (subnets). These entities are typically software programs executing on hardware computer platforms, such as end nodes and intermediate network nodes. The intermediate network nodes interconnect the communication links and subnets to enable transmission of data between the end nodes, such as personal computers or workstations. A local area network (LAN) is an example of a subnet that provides relatively short distance communication among the interconnected nodes, whereas a wide area network (WAN) enables long distance communication over links provided by public or private telecommunications facilities. The Internet is an example of a WAN that connects dSParate computer networks throughout the world, providing global communication between nodes on various networks.

Communication software executing on the nodes correlate and manage data communication with other nodes. The nodes typically communicate by exchanging discrete messages or packets of data according to predefined protocols, such as the Transmission Control Protocol/Internet Protocol (TCP/IP). In this context, a protocol consists of a set of rules defining how the nodes interact with each other. In addition, network routing software executing on the intermediate nodes allows expansion of communication to other nodes. Collectively, these hardware and software components comprise a collection of computer networks.

Since management of computer networks can prove burdensome, smaller groups of one or more computer networks can be maintained as separate routing domains or autonomous systems (AS's). In this context, a routing domain is broadly construed as a collection of interconnected nodes within a common address space (e.g., a level, area or AS), and an AS is a routing domain managed by a single administrative entity, such as a company, an academic institution or a branch of government. To interconnect dSPersed networks and/or provide Internet connectivity, many organizations rely on the infrastructure and facilities of Internet Service Providers (hereinafter "Service Provider" or "SP").

An SP is an example of an AS that typically owns one or more "backbone" networks configured to provide high-speed connection to the Internet. To interconnect private routing domains that are geographically diverse, an organization (customer) may subscribe to one or more SPs and couple its private domain networks to the SP's equipment. Here, an intermediate network node, such as a switch or router, may be utilized to interconnect a plurality of private networks to an IP backbone network.

A main component in a router is a routing information base (RIB). The RIB is a process that manages a routing table that may hold many (e.g., thousands) routes computed by different protocols, including both interior gateway protocols (IGP) and exterior gateway protocols (EGP). IGP protocols, such as conventional link-state protocols, are intra-domain routing protocols that define the manner with which routing information and network-topology information are exchanged and processed in a routing domain, such as an SP backbone network. Examples of conventional link-state protocols include, but are not limited to, the Open Shortest Path First (OSPF) protocol and the Intermediate-System-to-Intermediate-System (ISIS) protocol. The OSPF protocol is described in more detail in Request for Comments (RFC) 2328, entitled *OSPF Version 2*, dated April 1998, which is incorporated herein by reference in its entirety. The ISIS protocol is described in more detail in RFC 1195, entitled *Use of OSI IS-IS for Routing in TCP/IP and Dual Environments*, dated December 1990, which is incorporated herein by reference in its entirety.

Each router running IGP maintains an identical link-state database (LSDB) describing the topology of the routing domain. Each piece of the LSDB is a particular router's local state, e.g., the router's usable interfaces and reachable neighbors or adjacencies. As used herein, neighboring routers (or "neighbors") are two routers that have interfaces to a common network, wherein an interface is a connection between a router and one of its attached networks. Moreover, an adjacency is a relationship formed between selected neighbors for the purpose of exchanging routing information and abstracting the network topology. One or more router adjacencies may be established over an interface. Each router distributes its local state throughout the domain in accordance with an initial LSDB synchronization process and a conventional flooding algorithm.

On the other hand, EGP's are inter-domain routing protocols that define how information is exchanged between autonomous systems. One well known EGP is the Border Gateway Protocol version 4 (BPG). To implement the BGP protocol, each routing domain (e.g., AS) includes at least one "border" router through which it communicates with the other interconnected AS's. Before transmitting messages, however, the routers cooperate to establish a logical "peer" connection (session). BGP generally operates over a reliable transport protocol, such as TCP. The peer BGP's exchange routing (reachability) information among the neighboring autonomous systems. The BGP processes exchange routing information with other BGP processes that are not in the same AS using an external form of BGP, and with BGP processes within the same AS using an internal form of BGP.

The routing information exchanged by BGP neighbors typically includes destination address prefixes, i.e., the portions of destination addresses used by the routing protocol to render routing ("next hop") decisions, and associated path attributes. Examples of such destination addresses include Internet Protocol (IP) version 4 (IPv4) and version 6 (IPv6) addresses. An example of a path attribute is a next-hop address. Note that the combination of a set of path attributes and a prefix is referred to as a "route"; the terms "route" and "path" may be used interchangeably herein. The BGP routing protocol is well known and described in detail in RFC 1771, by Y. Rekhter and T. Li (1995), Internet Draft <draft-ietf-idr-bgp4-20.txt> titled, *A Border Gateway Protocol 4 (BGP-4)* by Y. Rekhter and T. Li (April 2003) and *Interconnections, Bridges and Routers*, by R. Perlman, published by Addison Wesley Publishing Company, at pages 323-329 (1992), all disclosures of which are hereby incorporated by reference.

Service Providers (SP's) are one example of sites that generally have highly valuable resources in their networks, for example, content servers, data storage servers, media gateways, media servers, etc. Every border point of the SP network is potentially an entry into the SP network for a malicious user attacking the valuable resources. For example, a denial of service (DOS) attack floods the resource with requests so that legitimate requests are ignored or at best responded to after long delays. In effect the resource is rendered useless.

An SP or other AS network manager with valuable resources, typically, need only fear malicious users that are sending packets toward the valuable resources from an external interface. Such an interface is external if the IGP has no adjacency over it, for example, if the source is not on the SP's backbone. One known approach to protect those resources is by using Access Control Lists (ACL's). An ACL acts as a filters by controlling whether routed packets are forwarded or blocked at the router's interface. Each packet is examined based on pre-specified criteria found in the ACL. If the criteria are met, the packet is forwarded in a normal fashion. Note, an ACL may be used negatively where if pre-specified criteria is met the packet is dropped and/or logged. But, herein ACL's are assumed to be used in a positive sense. The criteria used to route or block in an ACL is very flexible and may include: source or destination addresses or ranges thereof, and protocols, where each protocol may have is own specific set of criteria. At the end of the list, if a packet matches no criteria it is dropped and/or logged, etc.

Still, in an AS having many border routers, keeping ACL's up-to-date is a laborious and operationally intensive task since the ACL's or other such devices need to be loaded into each and every border router, typically by a network manager. The present invention is directed towards making the protection of a network's valuable resources more automatic, simpler and less laborious.

SUMMARY OF THE INVENTION

The present invention provides a system and method for flagging address prefixes as being highly valuable, important resources whose access are limited in an autonomous system network, such as a service provider (SP) network. An administrator or a user (if enabled by the SP) of the SP flags the prefixes, for example by setting a flag bit, pointing to the important resources. The flag bit along with the prefixes are stored in a routing table. Routers within the SP advertise local states of their routing tables, including the flag bit. In this manner the flagged address prefixes of the important resources within the SP network are automatically transferred to all routers in the network.

Within each router, the address prefixes, including the flag bit, of the routing table are used to construct a forwarding table. On border routers, the interfaces to external nodes are arranged to flag any incoming packets with another flag bit. A packet received on one of these interfaces is flagged and sent to a packet forwarding engine. The forwarding engine looks-up the destination prefix from the received packet in the forwarding table. If the prefix is found, the forwarding engine compares the state of the flag bit, if any, from the forwarding table to the state of the flag bit from the interface, and, if they match, the packet is dropped and/or logged.

In other embodiments, the flags, discussed above, may be used in a negative logic sense. For example, the flag bit indicating a valuable resource prefix may be reset, and the flag from an externally connected interface may be reset. In any case the logic operations regarding these flags may be arranged in practical instances as the system designer may dictate.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
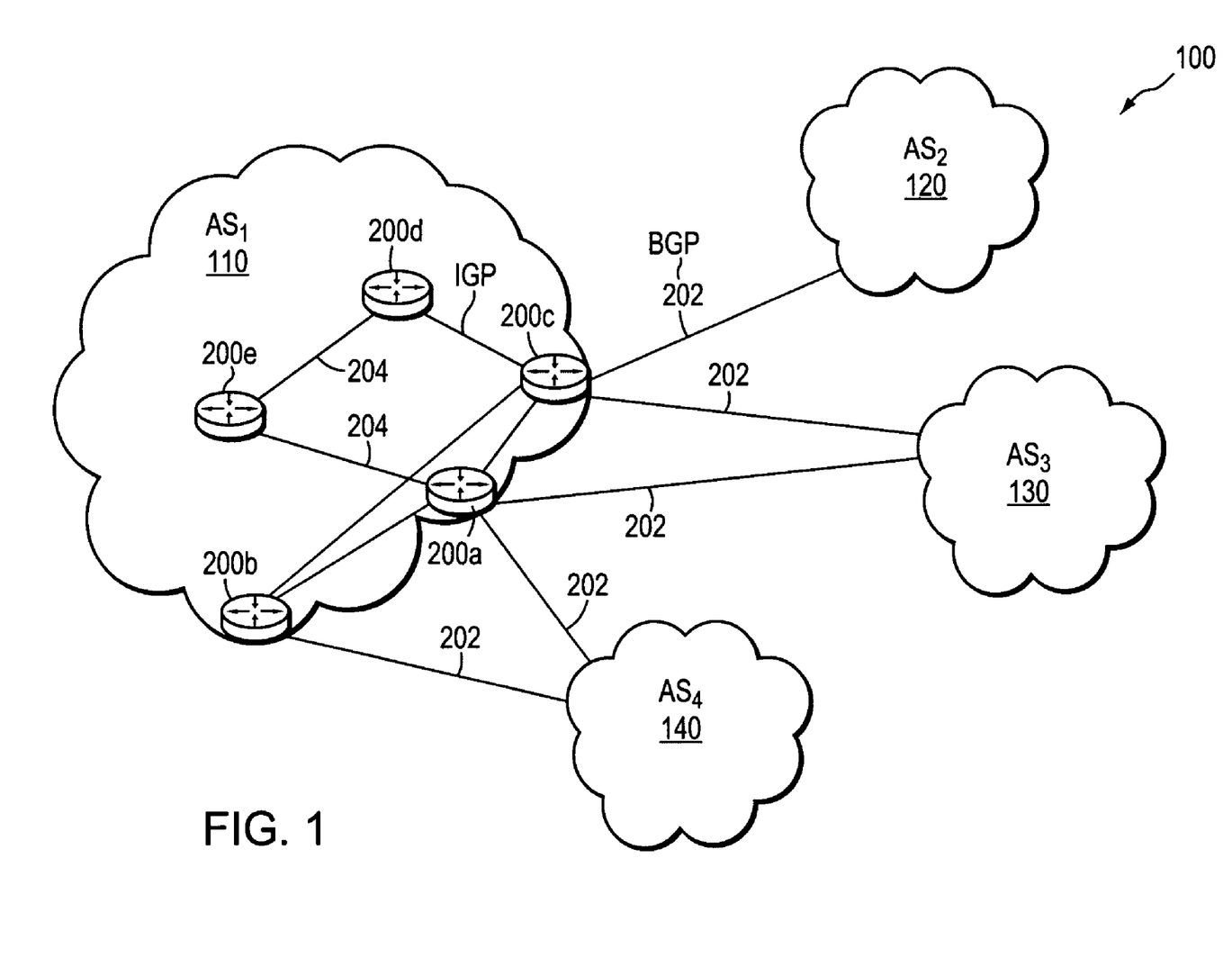
FIG. 1 is a schematic block diagram of a computer network comprising a plurality of routing domains interconnected by intermediate network nodes, such as routers.

FIG. 1 is a schematic block diagram of a computer network 100 comprising a plurality of routing domains interconnected by intermediate network nodes. The intermediate network nodes may comprise switches, but, in the illustrative embodiment, they are routers 200. The routing domains or autonomous systems ($AS_{1-4}$) are illustratively interconnected by border routers 200a-c via point-to-point communication links 202, such as frame relay links, asynchronous transfer mode links or other serial links. The border routers 200a-c of AS 110 ($AS_1$) are illustratively coupled to routers 200d-e via subnetworks, such as local area networks 204. Communication among the routers 200 is typically effected by exchanging discrete data packets or messages in accordance with predefined protocols, such as the Transmission Control Protocol/Internet Protocol (TCP/IP). It will be understood to those skilled in the art that other protocols, such as the Internet Packet Exchange (IPX) protocol, may be advantageously used with the present invention.

Routing decisions within each AS may rely on a predetermined "interior" gateway routing protocol (IGP) where routing information and network topology information is exchanged. An example of an IGP is a conventional link-state protocol, for example, OSPF or ISIS as discussed above. In addition, routing information may be exchanged among the AS's 110-140 using an "exterior" gateway protocol (EGP), such as the Border Gateway Protocol version 4 (BGP). As mentioned above, the routers 200a-c exchange routing information with other BGP processes that are not in the same AS using an external form of BGP, with each other using an internal form of BGP, and with the internal nodes using IGP.

Figure 2:
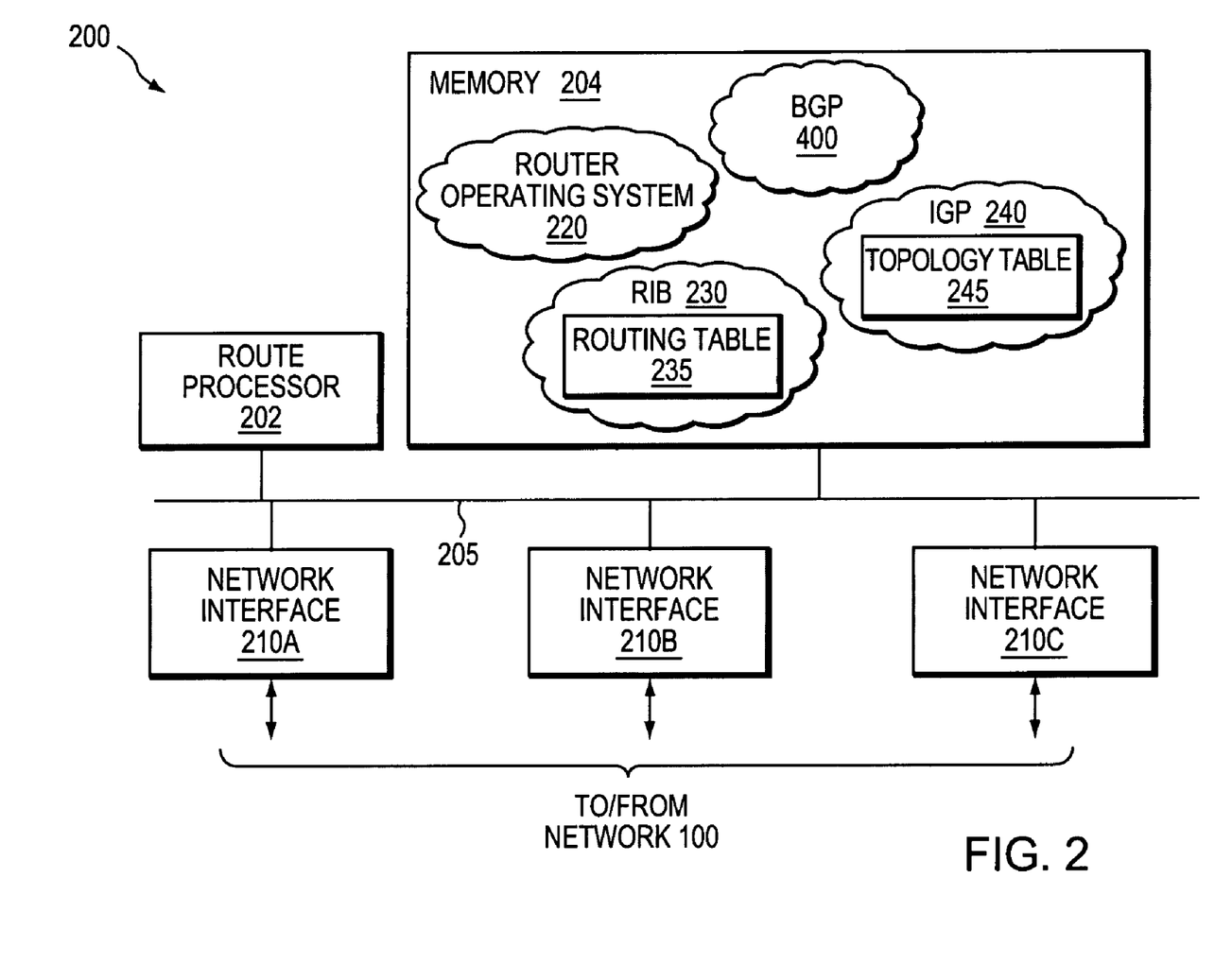
FIG. 2 is a schematic block diagram of an embodiment of a router that may be advantageously used with the present invention.

FIG. 2 is a schematic block diagram of a router 200 that may be advantageously used as a border or interior router in accordance with the present invention. The router 200 comprises a route processor 202 coupled to a memory 204 and a plurality of network interface adapters $210_{A-C}$ via a bus 205. The memory 204 may comprise storage locations addressable by the processor and interface adapters for storing software programs and data structures, such as a routing table 235 and topology table 245, respectively, that may be advantageously used with the inventive technique described herein. However, the network interfaces $210_{A-C}$ may contain distinct forwarding routing tables, memory and processors running forwarding operations, as discussed in FIG. 3. The route processor 202 may comprise processing elements or logic for executing the software programs and manipulating the data structures. It will be apparent to those skilled in the art that other processor and memory means, including various computer readable media, may be used for storing and executing program instructions pertaining to the invention described herein.

A router operating system 220, portions of which are typically resident in memory 204 and executed by the route processor 202, functionally organizes the router by, inter alia, invoking network operations in support of software processes executing on the router. In one embodiment of the invention, the operating system 220 may be implemented as a single process with a large memory address space, wherein pieces of code within that process provide operating system services, such as one or more routing protocols. Yet, in the illustrative embodiment, the operating system services may be implemented as separately-scheduled processes in distinct, protected address spaces. These software processes, each with its own process address space, execute on the router to manage resources internal to the router and, in the case of a routing protocol, to interact with users. As described herein, these software processes include routing information base (RIB 230) and routing protocol modules, such as IGP 240 and BGP 400. An interior router would not run the BGP 400, but the remaining blocks apply generally to both a border and an internal router. Communication among the processes is typically effected by the exchange of messages. One known message-passing mechanism provided by router operating system 220 to transfer information between processes (and process address spaces) is the Inter Process Communication (IPC) mechanism.

Figure 3:
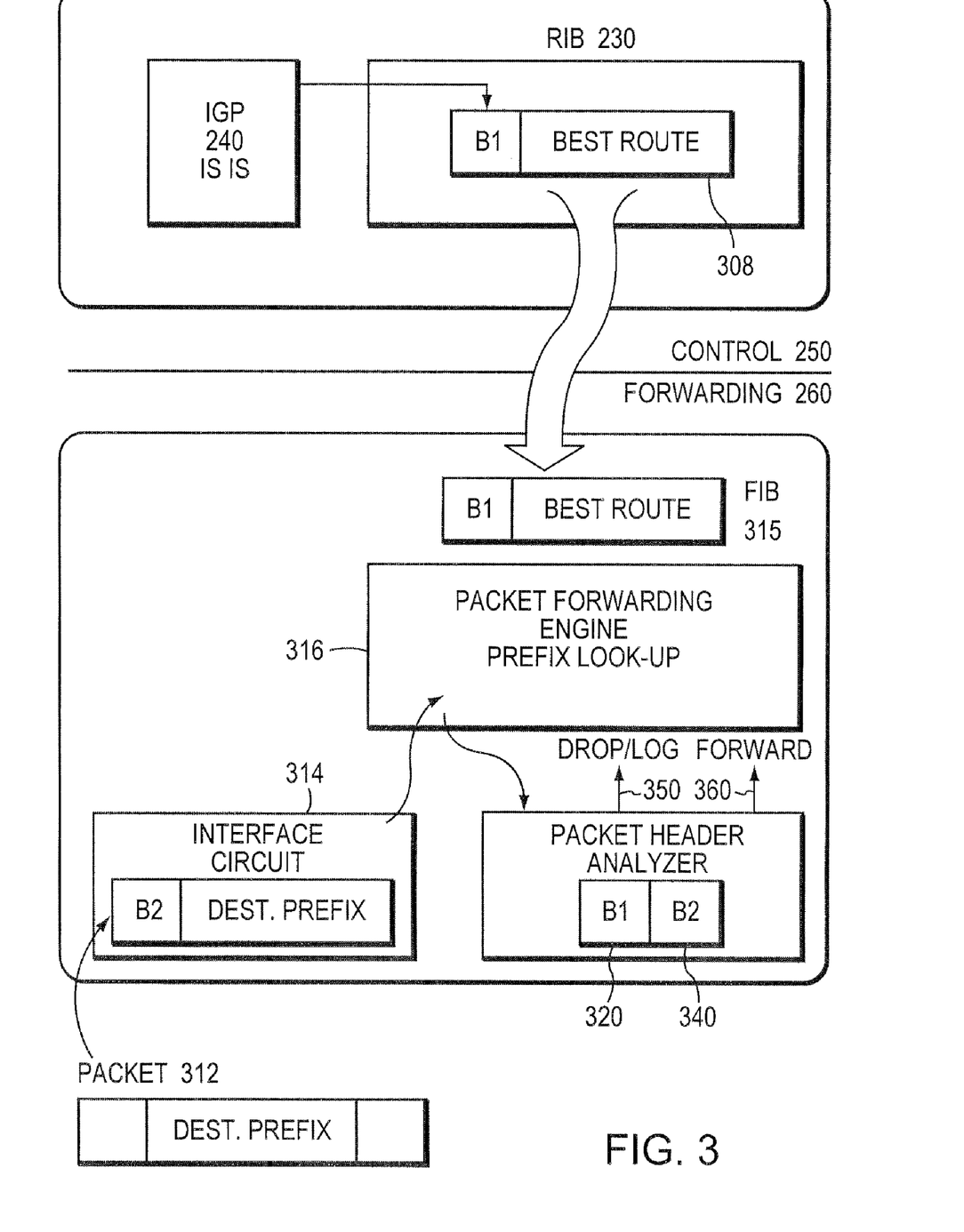
FIG. 3 is a functional block diagram of the operations within a router illustrating the present invention.

FIG. 3 is a block diagram of more detailed operations of the router 200 of FIG. 2 configured in accordance with the present invention. The router, generally, comprises a control plane 250 and a forwarding plane 260. The forwarding plane 260, with respect to the present invention, includes a forwarding information base (FIB) 315, a packet forwarding engine 316, a packet header analyzer 340, and an external interface process 314. Referring to FIGS. 2 and 3, the routing table 235, including the flagged (B1) bits and best paths, managed by the RIB 230, are used to populate a forwarding table 310 of the FIB 315. To that end, RIB 230 is a process that manages the routing table 235 that holds many thousands of routes computed by different protocols, including IGP and BGP (border gateway protocol).

As discussed before, IGP protocols, such as conventional link-state protocols, are intra-domain routing protocols that define the manner in which routing information and network topology are exchanged and processed in a routing domain, such as an SP backbone network. In this embodiment of the present invention and as known in the art, an administrator explicitly configures a prefix as addresses that are important and to be protected. Another approach is for users to tag important prefixes as important with an administrative tag. An example of such tagging is found in the conventional ISIS route tagging found in the above incorporated ISIS reference. In either case or by other means as may be known to those skilled in the art, the routing table 235 contains the address prefixes that have been designated as addresses leading to important resources. In the routing table, these important routes are tagged or flagged (tagging and flagging are used interchangeably herein) by setting the flag bit B1.

As also discussed, each router running a link-state protocol (i.e., IGP) maintains an identical link-state database (LSDB) describing the topology of the routing domain, which includes, at least, the router's usable interfaces and reachable neighbors or adjacencies. Routers use Link State Advertisements (LSA's) to transmit ("advertise") among its neighboring routers until all those routers can construct the same "view" of the network topology by aggregating the received information into a topology table 245. Each entry in the topology table 245 includes the destination address and a list of neighbors that have advertised the destination. An example of a topology table is the LSDB having a map of every router, its links and the states of those links in the routing domain. The LSDB also has a map of every network and every path to each network in the routing domain, including the best paths to valuable resources having the B1 flag set. Notably, the rise of IGP LSA's is extended to ensure that the flagged (B1 set) best paths are automatically distributed to all the neighboring routers throughout the domain. In contrast, the prior art required manual intervention to load ACL's.

The present invention provides a system and method for flagging address prefixes as being highly valuable, important resources whose access are limited in an autonomous system network, such as a service provider (SP) network. An administrator or a user (if enabled by the SP) of the SP flags the prefixes, for example by setting a flag bit, pointing to the important resources. The flag bit along with the prefixes are stored in a routing table. Routers within the SP advertise local states of their routing tables, including the flag bit. In this manner the flagged address prefixes of the important resources within the SP network are automatically transferred to all routers in the network.

Within each router, the address prefixes, including the flag bit, of the routing table are used to construct a forwarding table. On border routers, the interfaces to external nodes are arranged to flag any incoming packets with another flag bit. A packet received on one of these interfaces is flagged and sent to a packet forwarding engine. The forwarding engine looks-up the destination prefix from the received packet in the forwarding table. If the prefix is found, the forwarding engine compares the state of the flag bit, if any, from the forwarding table to the state of the flag bit from the interface, and, if they match, the packet is dropped and/or logged.

When a packet 312 is received from the interface circuit 314 (configured to run BGP), the interface attaches a flag B2 to the packet. A packet forwarding engine 316 processes the packet by looking-up the destination prefix of the packet in the FIB table 310 to obtain forwarding information. The entry from the forwarding table 310 is retrieved and a packet buffer header 320 is formed containing both B2 and B1 flags. The two flags, B1 and B2, are logically "ANDED." The result is analyzed by the packet header analyzer 340, and, if true, that packet is dropped and/or logged for later inspection 350. If the result is false 360 the packet is forwarded.

In practice the determination of the external packet, the tagging with B2, and the header analysis may be accomplished with an ASIC (application specific integrated circuit) or software/firmware or combinations thereof as known to those in the art. In addition, the prefix look-up and the packet header analysis may be accomplished with a single processor or dedicated hardware including one or more ASIC's. Yet in other examples, practitioners in the art may use one or more processors that combine the "control" and "forwarding" planes into one processor, or combinations of processors, firmware, ASIC's, etc.

In the above illustration, the B1 flag indicates a prefix to addresses of an important resource, and the B2 flag indicates a packet from an external source. The "ANDING" of B1 and B2 indicates that the external packet addresses an important resource, and the logic in the illustrative example prevents that packet from reaching that resource. However, in specific networks, a packet from an external site connected to specific interfaces, e.g., interface 314, on a router may be allowed. In such a case, the B2 flag may be set to indicate the packet is "internal" and, as such, will not be dropped by the packet forwarding engine 316 when the packet header is analyzed. Similarly, a packet entering from a specific interface connected to an internal node, e.g., via IGP, may be dropped by the IGP process 240 setting a B2 flag to indicate "external."

Also, as known to those in the art, the use of the flags B1 and B2 can be used to advantage in a positive or negative or mixed sense. In the illustrative example above, the flags are used in a positive sense with B1 indicating an important prefix, and B2 indicating a packet from an external node. When both are true the packet is dropped. Obviously the inclusive "OR" condition can be stated as follows: when either flag is reset the packet is forwarded normally. That is if the packet is sourced externally or the destination is not tagged as important then the packet is forwarded.

As would be evident to those skilled in the art for specific applications, the present invention can be used to advantage with the flags given different meanings, and the result of the "ANDING" of the flags could be reversed from the above example.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. In addition, it is understood that the data structures described herein can include additional information while remaining within the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for automatically protecting important resources within an autonomous system network, the method comprising:
   creating a first flag associated with an address prefix, the first flag indicating the address prefix is of an important resource within the network,
   receiving a packet from an external node with respect to the network,
   creating a second flag associated with the packet from the external node, the second flag indicating the packet is from an external source,
   comparing the first and the second flags,
   determining if the packet is from the external source and is destined for the important resource based on the comparing of the first and the second flags, and, if so,
   preventing the packet from being forwarded to that prefix.

2. The method of claim 1 further comprising the step of advertising the address prefix and the first flag to other nodes within the autonomous system network.

3. The method of claim 1 wherein the step of determining includes finding that both the first and the second flags are true indicating that the packet is from the external source and is directed to an important resource.

4. The method of claim 1 further comprising creating a flag associated with an address prefix within the network that is not important.

5. The method of claim 1 further comprising:
   defining a specific interface connected to the external node,
   receiving the packet from that interface,
   flagging that packet as from the external source in response to receiving the packet from that interface.

6. The method of claim 1 wherein the step of creating a first flag comprises:
   storing the address prefix in a routing table, and
   storing the flag as a tag bit with the address prefix in the routing table.

7. A method for automatically protecting important resources within an autonomous network, the method comprising:
   storing routing information as addresses in a routing table,
   creating first flag bits associated with the addresses of important resources,
   transferring the routing table addresses and the flag bits to a forwarding address table,
   receiving a packet at an interface,
   determining that the packet is from a node external to the network, and if from an external node, creating a second flag bit associated with the packet,
   looking up the destination address prefix from the received packet,
   looking up the forwarding address prefix from the forwarding address table,
   comparing the first flag bit from the forwarding address table to the second flag bit, and, if both are true, dropping or logging the packet.

8. A system for automatically protecting important resources within an autonomous network, the system comprising:
   a first flag associated with an address prefix within the network, the first flag indicating the address prefix is of an important resource,
   a second flag associated with a packet from an external node, the second flag indicating the packet is from an external source, and
   logic that compares the first and the second flags, wherein if the comparison of the first and the second flags indicates the packet is from the external source and is destined for the important resource the packet is not forwarded to that prefix.

9. The system of claim 8 further comprising means for advertising the address prefix and the first flag to other nodes within the autonomous network.

10. The system of claim 8 wherein the logic that compares the first and the second flags finds that both flags are true indicating that the packet is from the external source and is directed to the important resource.

11. The system of claim 8 wherein a flag is associated with an address prefix within the network that is not important.

12. The system of claim 8 wherein further comprising:
   a specific interface that is connected to the external node, wherein the packet is received from that interface.

13. The system of claim 8 further comprising:
   a routing table storing the address prefix and the first flag as a tag bit with the address prefix.

14. A system for automatically protecting important resources within an autonomous network, the system comprising:
   a forwarding table storing forwarding information as addresses,
   a first flag associated with the addresses of important resources, wherein the first flag is stored as a bit with the addresses of important resources,
   an interface arranged for receiving packets from nodes external to the network,
   a second flag associated with a packet received from the interface, wherein the second flag is stored as a bit with the received packet, and
   logic that takes the destination address prefix from the received packet and looks up that destination address from the forwarding table and compares the first flag bit to the second flag bit, and, if both are true, drops or logs the packet.

15. A system for automatically protecting important resources within an autonomous network, the system comprising:
- means for creating a first flag associated with an address prefix within the network, the first flag indicating the address prefix is of an important resource,
- means for receiving a packet from an external node with respect to the network,
- means for creating a second flag associated with the packet from the external node, the second flag indicating the packet is from an external source,
- means for comparing the first and the second flags, and
- means for determining if the packet is from the external source and is destined for the important resource, in response to comparison of the first and the second flags, and, if so, preventing the packet from being forwarded to that prefix.

16. A computer readable medium containing executable program instructions for execution on a processor for configuring one or more intermediate nodes for automatically protecting valuable resources within an autonomous network, the executable program instructions comprising program instructions for:
- creating a first flag associated with an address prefix within the network, the first flag indicating the address prefix is of an important resource,
- receiving a packet from an external node with respect to the network,
- creating a second flag associated with the packet from the external node the second flag indicating the packet is from an external node,
- comparing the first and the second flags,
- determining if the packet is from an external node and is destined for the important resource based on the comparing of the first and the second flags, and, if so,
- preventing the packet from being forwarded to that prefix.

17. The computer readable medium of claim 16 further comprising program instructions for advertising the address prefix and the first flag to other nodes within the autonomous network.

* * * * *

UNITED STATES PATENT AND TRADEMARK OFFICE
CERTIFICATE OF CORRECTION

PATENT NO. : 7,639,688 B2 Page 1 of 1
APPLICATION NO. : 11/183381
DATED : December 29, 2009
INVENTOR(S) : Filsfils et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1118 days.

Signed and Sealed this

Twenty-first Day of December, 2010

David J. Kappos
*Director of the United States Patent and Trademark Office*